(12) United States Patent
Kwon et al.

(10) Patent No.: US 12,510,584 B2
(45) Date of Patent: Dec. 30, 2025

(54) TEST BOARD AND TEST METHOD FOR SEMICONDUCTOR DEVICE USING THE SAME

(71) Applicant: Samsung Electronics Co., Ltd., Suwon-si (KR)

(72) Inventors: Soonil Kwon, Suwon-si (KR); Seongseob Shin, Suwon-si (KR); Dongho Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 255 days.

(21) Appl. No.: 18/300,870

(22) Filed: Apr. 14, 2023

(65) Prior Publication Data

US 2024/0077535 A1 Mar. 7, 2024

(30) Foreign Application Priority Data

Sep. 1, 2022 (KR) .................. 10-2022-0110996

(51) Int. Cl.
| | |
|---|---|
| *G01R 31/28* | (2006.01) |
| *G01R 31/26* | (2020.01) |
| *G01R 31/317* | (2006.01) |
| *G01R 31/319* | (2006.01) |

(52) U.S. Cl.
CPC ..... *G01R 31/2834* (2013.01); *G01R 31/2839* (2013.01); *G01R 31/31721* (2013.01); *G01R 31/31905* (2013.01); *G01R 31/31924* (2013.01); *G01R 31/2601* (2013.01);
(Continued)

(58) Field of Classification Search
CPC ............ G01R 31/2834; G01R 31/2839; G01R 31/31721; G01R 31/31905; G01R 31/31924; G01R 31/2601; G01R 31/2868; G01R 31/2884; G01R 31/2896;
(Continued)

(56) References Cited

U.S. PATENT DOCUMENTS

| | | |
|---|---|---|
| 7,279,918 B2 | 10/2007 | Marr |
| 7,360,116 B2 | 4/2008 | Nakamura |
| 7,621,761 B2 | 11/2009 | Mok et al. |

(Continued)

FOREIGN PATENT DOCUMENTS

| | | |
|---|---|---|
| KR | 10-0688517 B1 | 3/2007 |
| KR | 10-0821095 B1 | 4/2008 |

(Continued)

*Primary Examiner* — Amy He
(74) *Attorney, Agent, or Firm* — Harness, Dickey & Pierce, P.L.C.

(57) ABSTRACT

Disclosed is a test board which includes a substrate that includes a device under test (DUT) placement area where a first DUT and a second DUT are disposed, a first load switch connected in series with the first DUT and configured to be set to a switch on state or a switch off state based on a first enable signal, a second load switch connected in series with the second DUT and configured to be set to the switch on state or the switch off state depending on a second enable signal, and a test controller. The test controller may be configured to perform a test operation in a (1-1)-th mode by activating the first enable signal and deactivating the second enable signal and then perform the test operation in a (1-2)-th mode by deactivating the first enable signal and activating the second enable signal.

19 Claims, 13 Drawing Sheets

(52) U.S. Cl.
CPC ...... *G01R 31/2868* (2013.01); *G01R 31/2884* (2013.01); *G01R 31/2896* (2013.01)

(58) Field of Classification Search
CPC ............ G01R 31/2879; G01R 31/2844; G01R 1/206; G01R 31/01; H01L 22/12; H01L 22/30
See application file for complete search history.

(56) References Cited

U.S. PATENT DOCUMENTS

| | | |
|---|---|---|
| 7,626,413 B2 | 12/2009 | Lee et al. |
| 8,225,150 B2 | 7/2012 | Hur et al. |
| 9,281,081 B1 | 3/2016 | Kang |
| 9,316,685 B2 | 4/2016 | Ku et al. |
| 2005/0007140 A1* | 1/2005 | Kim ................. G01R 31/31905 324/750.01 |
| 2020/0379035 A1 | 12/2020 | Yun et al. |
| 2022/0334169 A1* | 10/2022 | Sakata ............... G01R 31/2601 |

FOREIGN PATENT DOCUMENTS

| | | |
|---|---|---|
| KR | 10-0952438 B1 | 4/2010 |
| KR | 10-2010-0121219 A | 11/2010 |
| KR | 10-2382014 B1 | 1/2019 |
| KR | 10-2020-0136697 A | 12/2020 |

* cited by examiner

TEST BOARD AND TEST METHOD FOR SEMICONDUCTOR DEVICE USING THE SAME

CROSS-REFERENCE TO RELATED APPLICATIONS

This application claims priority under 35 U.S.C. § 119 to Korean Patent Application No. 10-2022-0110996 filed on Sep. 1, 2022, in the Korean Intellectual Property Office, the disclosures of which are incorporated by reference herein in their entireties.

BACKGROUND

Some example embodiments of the present disclosure described herein relate to test boards and/or methods for testing a semiconductor device by using the test board, and more particularly, relate to test boards including load switches that are turned on or turned off by an enable signal and/or test methods using the test board.

With the rapid development of the electronic industry and the demand of users, electronic products are becoming smaller, more functional, and larger in capacity. As such, a test for a semiconductor device included in an electronic product is also becoming more complicated. For example, tens or hundreds of semiconductor devices may be simultaneously tested as a device under test (DUT) in a test environment. To this end, there are required a test board and a test system capable of satisfying various test environments.

SUMMARY

Some example embodiments of the present disclosure provide test boards capable of improving the degree of integration.

Some example embodiments of the present disclosure provide a test board capable of providing an improved supply power when a test operation is performed on a device under test.

According to an example embodiment, a test board may include a substrate that includes a device under test (DUT) placement area where a first device under test and a second device under test are disposed, a first load switch connected in series with the first device under test and configured to be set to a switch on state or a switch off state based on a first enable signal, a second load switch connected in series with the second device under test and configured to be set to the switch on state or the switch off state depending on a second enable signal, and a test controller. The test controller may be configured to perform a test operation in a (1-1)-th mode by activating the first enable signal and deactivating the second enable signal and then perform the test operation in a (1-2)-th mode by deactivating the first enable signal and activating the second enable signal. The test controller may include a power source configured to generate a test power and provide the test power to the first load switch and the second load switch, when the test operation is performed. In the (1-1)-th mode, the first load switch may be configured to be set to the switch on state and the second load switch may be configured to be set to the switch off state, to perform the test operation on the first device under test. In the (1-2)-th mode, the first load switch may be configured to be set to the switch off state and the second load switch is configured to be set to the switch on state, to perform the test operation on the second device under test.

According to an example embodiment, a test method using a test board configured to perform a test operation for a first test item with respect to a first device under test and a second device under test may include performing the test operation for the first test item in a (1-1)-th mode by activating a first enable signal provided to a first load switch connected with the first device under test and deactivating a second enable signal provided to a second load switch connected with the second device under test, and performing the test operation for the first test item in a (1-2)-th mode by deactivating the first enable signal and activating the second enable signal. In the (1-1)-th mode in which the first load switch is set to a switch on state and the second load switch is set to a switch off state, the test operation for the first test item may be performed on the first device under test. In the (1-2)-th mode in which the first load switch is set to the switch off state and the second load switch is set to the switch on state, the test operation for the first test item may be performed on the second device under test.

According to an example embodiment, a test method may include calculating a minimum supply power to be supplied to a plurality of first devices under test and a plurality of second devices under test as a reference power, obtaining power consumption for each device under test when a test operation for a test item is performed, performing the test operation for the test item on the plurality of first devices under test in a (1-1)-th mode where a first enable signal provided to a plurality of first load switches connected with the plurality of first devices under test is activated and a second enable signal provided to a plurality of second load switches connected with the plurality of second devices under test is deactivated, and then performing the test operation on the plurality of second devices under test in a (1-2)-th mode where the first enable signal is deactivated and the second enable signal is activated, when the power consumption for each device under test is greater than the reference power, and simultaneously performing the test operation for the test item on the plurality of first devices under test and the plurality of second devices under test in a second mode where the first enable signal and the second enable signal are simultaneously activated, when the power consumption for each device under test is smaller than the reference power.

BRIEF DESCRIPTION OF THE DRAWINGS

The above and other objects and features of the present disclosure will become apparent by describing in detail some example embodiments thereof with reference to the accompanying drawings.

DETAILED DESCRIPTION

Below, some example embodiments of the present disclosure will be described in detail and clearly to such an extent that one skilled in the art easily carries out the present disclosure.

While the term "same," "equal" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Figure 1:
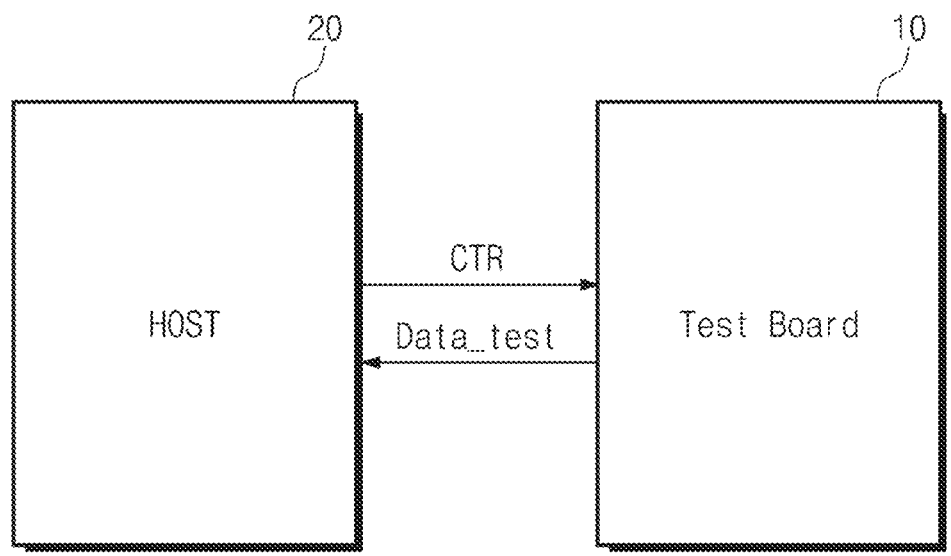
FIG. 1 is a diagram illustrating a test system according to an example embodiment of the present disclosure.

FIG. 1 is a diagram illustrating a test system according to an example embodiment of the present disclosure.

Referring to FIG. 1, a test system may include a test board 10 and a host 20. A plurality of devices under test (DUT) may be mounted on the test board 10. The host 20 may be configured to control the test board 10, to receive test data Data_test from the test board 10, and to determine whether semiconductor devices included in the devices under test are defective.

The host 20 may be configured to execute a test program and to process a test operation. The host 20 may process data or may parse a command to generate control signals CTR.

The host 20 may execute the test program to generate the control signals CTR and may provide the control signals CTR to the test board 10. The control signals CTR may include a test power control signal for generating and controlling a test power, a test input control signal for controlling an input signal to be provided to the devices under test, and a switch control signal for controlling load switches.

The test power control signal may refer to a signal for providing the supply power to the devices under test on the test board 10. The switch control signal may refer to a signal for controlling the load switches on the test board 10 to select devices under test, to which the test power is to be supplied.

The test board 10 may be configured to generate a test input signal, a test power(s), and an enable signal(s) based on the control signals CTR, to perform the test operation on devices under test based on the test input signal, the test power, and the enable signal, to interpret a test output signal output from a device under test, and to generate the test data Data_test based on the interpretation result.

The host 20 may receive the test data Data_test from the test board 10 and may perform the test operation accompanying the comparison of the test data Data_test and an expected pattern. When the test data Data_test read out from the device under test do not coincide with the expected pattern, the host 20 may identify that a semiconductor device included in the device under test being a test target is defective.

For example, when the semiconductor device is a memory device, the test program may store data generated by an algorithm pattern generator in the semiconductor device through a test input control signal, may read the data stored in the semiconductor device, and may compare the expected pattern and a readout pattern.

The test program that allows the host 20 to perform the test operation may be implemented with a semiconductor chip such as a field programmable gate array (FPGA), an application specific integrated circuit (ASIC), or an application processor (AP).

For example, the host 20 may be implemented by using the FPGA such as xilinx, altera, lattice semiconductor, microsemi, achronix, quicklogic, e2v, and atmel, but the present disclosure is not limited thereto. The host 20 may exchange various kinds of information with the devices under test included in the test board 10 by using the parallel (or serial) communication.

The test board 10 may be configured to perform the test operation on the plurality of devices under test in response to the control signals CTR from the host 20 and to generate the test data Data_test as a result of the test operation. The test board 10 may include a substrate including a device-under-test placement area where the plurality of devices under test are arranged, a test controller provided on the substrate, and a plurality of load switches.

The test controller may be configured to generate the test power based on the control signals CTR, to provide the test power to the plurality of load switches connected with the plurality of devices under test, and to generate the enable signal to control the plurality of devices under test.

The plurality of load switches may be disposed between the plurality of devices under test so as to be connected in series with corresponding ones of the devices under test, respectively. The number of load switches may be identical to the maximum number of devices under test to be mounted on the test board. Each of the plurality of load switches may be configured to receive the enable signal.

When the enable signal input to each load switch is activated, each load switch may operate in a short circuit state. When the enable signal input to each load switch is deactivated, each load switch may operate in an open circuit state.

For example, when the enable signal is activated, a turn-on voltage may be applied as the enable signal input to the load switch. When the enable signal is deactivated, a ground voltage may be applied as the enable signal input to the load switch. However, the present disclosure is not limited thereto. In some example embodiments, when the enable signal is deactivated, a voltage setting the load switch to the open circuit state may be applied as the enable signal input to the load switch.

The plurality of devices under test included in the test board 10 may include a substrate base and a DUT socket. DUT sockets for accommodating the DUTs to be tested may have various shapes and kinds depending on shapes and kinds of the DUTs, that is, semiconductor devices. For example, a device under test may include a DUT socket having a shape corresponding to a ball grid array (BGA), a plastic leaded chip carrier (PLCC), a plastic dual in-line package (PDIP), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), or a thin quad flat pack (TQFP), or may include a universal DUT socket capable of corresponding to various shapes. However, the DUT socket included in the device under test is not limited thereto.

A semiconductor device included in a device under test may perform various functions. In some example embodiments, the semiconductor device may include a memory device including a memory cell array. For example, the memory device may include a double data rate synchronous dynamic random access memory (DDR SDRAM), a low power double data rate (LPDDR) SDRAM, a graphics double data rate (GDDR) SDRAM, or a Rambus DRAM (RDRAM). In some example embodiments, the memory device may include a nonvolatile memory such as a flash memory, a magnetic RAM (MRAM), a ferroelectric RAM (FRAM), a phase change RAM (PRAM), or a resistive RAM (RRAM).

The test process for determining whether the semiconductor device is defective may be performed in various steps of a semiconductor manufacturing process. For example, the test process may include a test at a wafer step and a test after the wafer step. The test at the wafer step may correspond to a test for an individual semiconductor die of the wafer step. Also, the test after the wafer step may refer to a test for a semiconductor die before packaging is performed or a test for a semiconductor package where a semiconductor die is packaged (or included).

For example, a burn-in test refers to a test process for checking how much the semiconductor device withstands the thermal stress when an electrical signal is applied to the semiconductor device so as to operate. In other words, the burn-in test refers to a test process capable of detecting a defective semiconductor device, that is, a semiconductor device with a time-degradable defect, in advance, by providing a constant power to an integrated circuit included in the semiconductor device and accelerating the degradation of a defective part through repetitive internal operations.

A semiconductor device test method using the test board 10 according to some example embodiments of the present disclosure may refer to a test that is performed on a device under test including a semiconductor package after packaging. For example, the test for the semiconductor device may include a burn-in test operation, but the present disclosure is not limited thereto. For example, the test for the semiconductor device may include various kinds of tests for a device under test including a semiconductor package by using a power generated from a power source.

According to some example embodiments of the present disclosure, the test operation may be sequentially performed on the plurality of devices under test on the test board 10 by controlling the enable signal based on power consumption of a device under test. According to some example embodiments of the present disclosure, after the test operation is performed by providing a supply power to only some from among devices under test targeted for the test operation, the test operation may be performed by providing the supply power only to the remaining devices under test. As such, according to some example embodiments of the present disclosure, when a test operation is performed on some of devices under test, the some of the devices under test may be provided with a greater supply power compared to the case where the test power is provided to all the devices under test.

According to some example embodiments of the present disclosure, the power that is supplied to devices under test may be adjusted by controlling the enable signal. According to the present disclosure, devices under test may be tested simultaneously or sequentially by controlling the enable signal depending on the power consumption of a device under test for each test item. Accordingly, the test board according to the present disclosure may increase the number of devices under test to be mounted on the test board regardless of the power consumption of a device under test required or desired for each test item.

Figure 2:
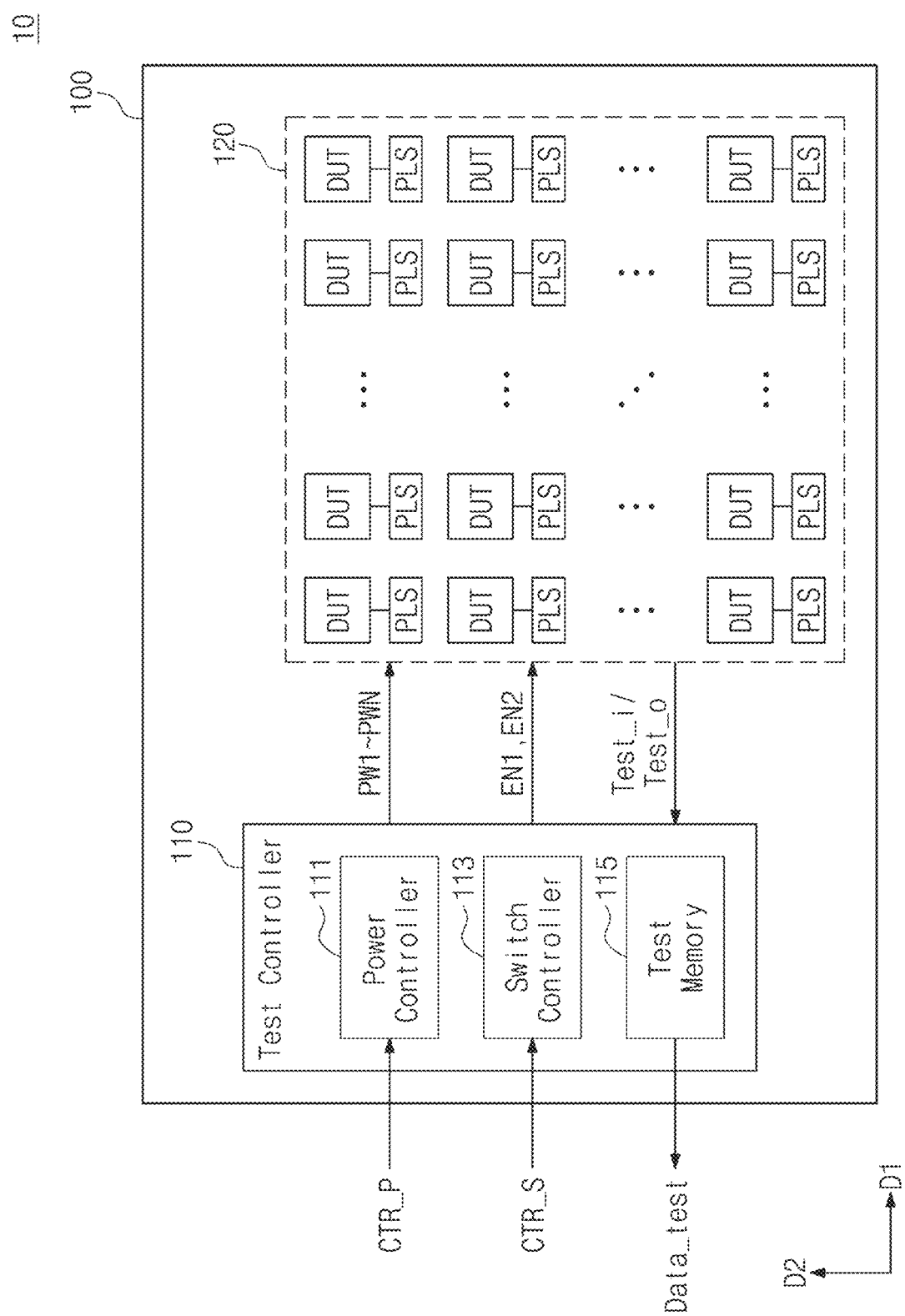
FIG. 2 is a diagram illustrating an embodiment of a test board of FIG. 1.

FIG. 2 is a diagram illustrating an example embodiment of a test board of FIG. 1. Below, a configuration and an operation of a test board according to an example embodiment of the present disclosure will be described in detail with reference to FIG. 2.

Referring to FIG. 2, the test board 10 may include a substrate 100, a test controller 110 provided on the substrate 100, and a plurality of load switches PLS. The plurality of devices under test DUT may be mounted on the substrate 100 of the test board 10. The test board 10 may be configured to receive the control signals CTR from the host 20 of FIG. 1 and to perform the test operation on the plurality of devices under test DUT.

The substrate 100 may include a controller placement area where the test controller 110 is disposed and a device under test placement area (hereinafter referred to as a "DUT placement area") 120 where the plurality of devices under test DUT are arranged. For example, the substrate 100 may include a printed circuit board (PCB).

The substrate 100 may include a plurality of transmission lines. The plurality of transmission lines may be connected between the test controller 110 disposed on the controller placement area and the plurality of devices under test DUT disposed on the DUT placement area 120 in a serial, parallel, or a serial-parallel manner and may transfer various kinds of signals.

For example, the test controller 110 may provide a test input signal Test_i, the test power, and the enable signal to the devices under test DUT through the plurality of transmission lines and may receive a test output signal Test_o from the devices under test DUT.

The test controller 110 may be disposed on the controller placement area of the substrate 100. The test controller 110 may include a power controller 111, a switch controller 113, and a test memory 115.

The test controller 110 may be configured to receive the control signals CTR from the host 20 and to generate the test input signal Test_i, test powers PW1 to PWN, and enable signals EN1 and EN2 for the purpose of performing the test operation on the plurality of devices under test DUT. The test controller 110 may be configured to perform the test operation on the plurality of devices under test DUT and to generate the test data Data_test including the test result.

The power controller 111 may be configured to generate the test powers PW1 to PWN in response to a test power control signals CTR_P among the control signals CTR and to supply the test powers PW1 to PWN to the devices under test DUT. The power controller 111 may include a plurality of power sources configured to generate the test powers PW1 to PWN. Each of the power sources may be connected with the given number of devices under test DUT.

The power controller 111 may be configured to generate a test power by using each power source and to provide a supply power such that the supply power is branched to the devices under test DUT connected therewith. The devices under test DUT connected with each power source may be connected in parallel. As such, the supply power provided to each of the devices under test DUT may have a magnitude obtained by dividing the test power output from the power source by the number of devices under test DUT connected with the power source to perform the test operation.

The switch controller 113 may be configured to generate the enable signals EN1 and EN2 in response to a switch power control signal CTR_S among the control signals CTR. The enable signals EN1 and EN2 may be used to select devices under test DUT targeted for the test operation from among the plurality of devices under test DUT.

The enable signals EN1 and EN2 generated by the switch controller 113 may be selectively connected with the plurality of load switches PLS. For example, the switch controller 113 may generate the first enable signal EN1 and the second enable signal EN2. The first enable signal EN1 and the second enable signal EN2 may be provided to different load switches PLS. In other words, the second enable signal EN2 may not be provided to the load switches PLS to which the first enable signal EN1 is applied.

However, the present disclosure is not limited thereto. For example, the switch controller 113 may further generate third to n-th enable signals to adjust a magnitude of the supply power to be supplied for each device under test. Switch controllers may generate enable signals so as to be supplied to different load switches.

The enable signals EN1 and EN2 may be provided to the load switch PLS connected with each of the plurality of devices under test DUT. When the enable signals EN1 and EN2 are activated, the load switch PLS may be set to the short circuit state, that is, a switch on state such that the supply power is provided to the device under test DUT connected therewith. When the enable signals EN1 and EN2 are deactivated, the load switch PLS may be set to the open circuit state, that is, a switch off state such that the supply power is not provided to the device under test DUT connected therewith.

The test memory 115 may store the test input signal Test_i including a command for a test pattern and/or may store the test output signal Test_o generated by the device under test DUT. The test memory 115 may be configured to provide the stored test input signal Test_i to a plurality of devices under test such that the test operation is performed.

The test memory 115 may include a buffer and storage. For example, the buffer may include a volatile memory, and the storage may include a nonvolatile memory. For example, the buffer may include a DRAM, and the storage may include a flash memory, a solid state drive (SSD), or a hard disk drive (HDD). The buffer may temporarily store a signal or may store the test output signal Test_o including the data read out from the device under test DUT. The storage may store the test pattern command.

The plurality of devices under test DUT may be mounted on the DUT placement area 120. The DUT placement area 120 may be in the shape of a rectangle, but the present disclosure is not limited thereto.

The plurality of devices under test DUT may be disposed on the DUT placement area 120 so as to be spaced from each other in a first direction D1 and a second direction D2 perpendicular to the first direction D1.

The load switches PLS may be provided on the substrate so as to be connected with the devices under test DUT one to one. In an example embodiment, the load switch PLS and the device under test DUT may be disposed to be spaced from each other in the second direction D2.

The plurality of devices under test DUT and the plurality of load switches PLS connected therewith may be classified into a plurality of test groups. In an example embodiment, devices under test DUT and load switches PLS included in each test group may be in parallel with the same power source. In another example embodiment, the devices under test DUT and the load switches PLS included in the plurality of test groups may be supplied with a power from the same power source.

In an example embodiment of the present disclosure, devices under test DUT and load switches PLS belonging to a test group connected with each power source will be described in detail with reference to FIGS. 3 and 4.

Figure 3:
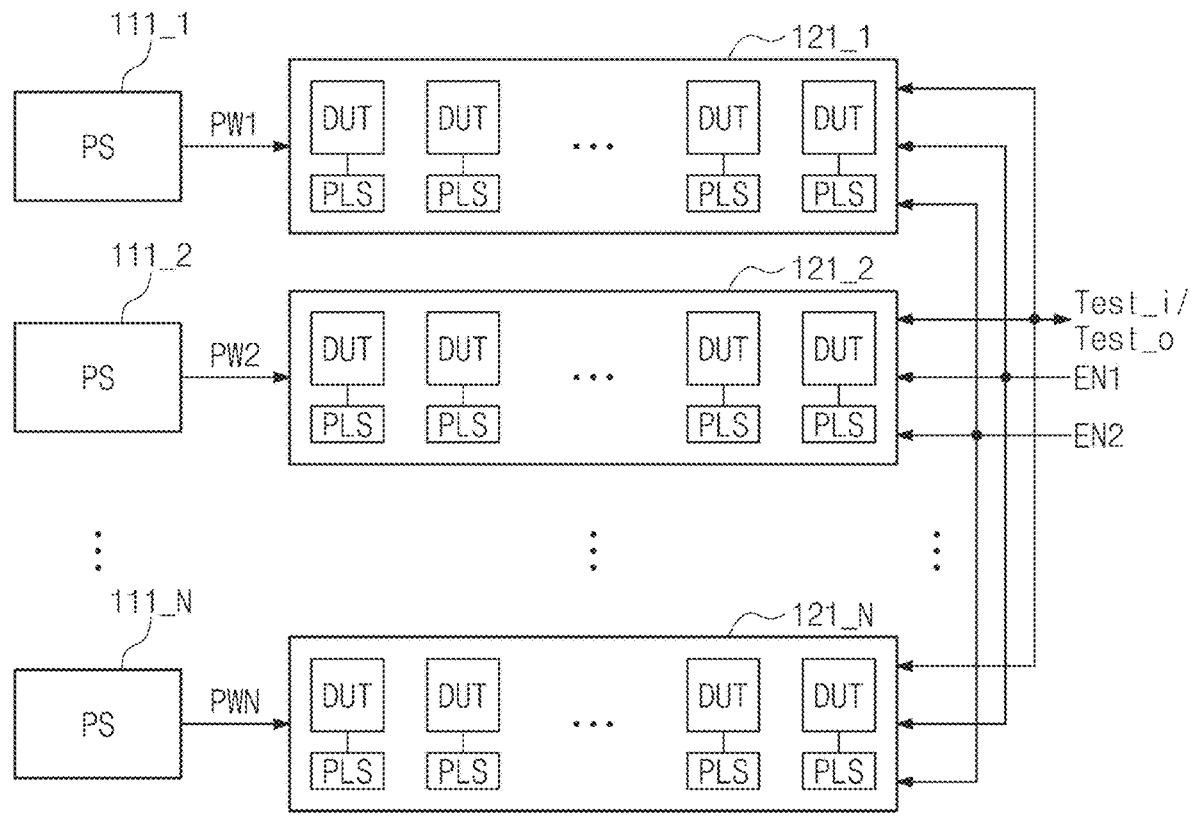
FIG. 3 is a diagram illustrating test groups each supplied with a power from a corresponding power source in FIG. 2, according to an example embodiment of the present disclosure.

FIG. 3 is a diagram illustrating test groups each supplied with a power from a corresponding power source in FIG. 2, according to an example embodiment of the present disclosure. FIG. 4 is a diagram for describing how a supply power is provided to devices under test of a first test group of FIG. 3. Below, a test board according to an example embodiment of the present disclosure will be described in detail with reference to FIGS. 3 and 4.

Referring to FIG. 3, in an example embodiment, the power controller 111 may include a plurality of power sources. The plurality of power sources may be configured to generate supply powers and to supply the supply powers to the devices under test DUT included in the plurality of test groups. The plurality of power sources may include first to n-th power sources 111_1, 111_2, . . . , 111_N, and the plurality of test groups may include first to n-th test groups 121_1, 121_2, . . . , 121_N.

The devices under test DUT and the load switches PLS included in each test group may be supplied with a supply power from a corresponding power source. For example, the devices under test DUT included in the first test group 121_1 may be provided with a first test power PW1 from the first power controller 111_1, the devices under test DUT included in the second test group 121_2 may be provided with a second test power PW2 from the second power controller 111_2, and the devices under test DUT included in the n-th test group 121_N may be provided with an n-th test power PWN from the n-th power controller 111_N. The test powers output from the first to n-th power sources 111_1, 111_2, ..., 111_N, respectively, may have substantially the same magnitude.

The plurality of load switches PLS may be provided between a power source and a plurality of devices under test DUT of each test group. Each load switch PLS may be connected in series between the power source and the device under test DUT.

Each load switch PLS may be configured to receive a corresponding test power and the enable signals EN1 and EN2 as an input from a corresponding power source and to output a supply power to the device under test DUT based on the enable signals EN1 and EN2. When the enable signals EN1 and EN2 are activated, the load switch PLS may be set to the switch on state such that the supply power is provided to the device under test DUT without modification. When the enable signals EN1 and EN2 are deactivated, the load switch PLS may be set to the switch off state such that the supply power is not provided to the device under test DUT.

One of the first enable signal EN1 or the second enable signal EN2 may be input to each load switch PLS. The second enable signal EN2 may not be input to the load switch PLS to which the first enable signal EN1 is input, and the first enable signal EN1 may not be input to the load switch PLS to which the second enable signal EN2 is input. Below the description will be given in detail with reference to the first test group 121_1 among the plurality of test groups 121_1 to 121_N.

Figure 4:
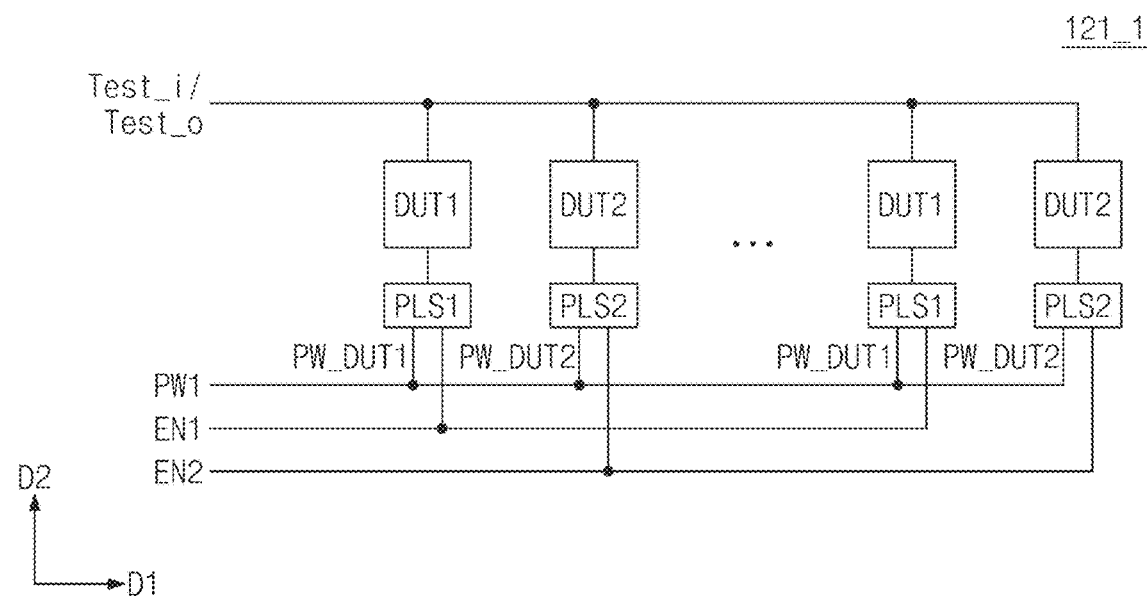
FIG. 4 is a diagram for describing how a supply power is provided to devices under test of a first test group of FIG. 3.

Referring to FIG. 4, a plurality of devices under test of the first test group 121_1 may include first devices under test DUT1 and second devices under test DUT2.

The first devices under test DUT1 and the second devices under test DUT2 may receive the test input signal Test_i. The test input signal Test_i may change depending on a kind of a semiconductor device included in a device under test. For example, when a semiconductor device included in a device under test is a memory device, the test input signal Test_i may include various kinds of signals including a command signal, an active signal, and an address signal.

When the supply power is provided, the first devices under test DUT1 and the second devices under test DUT2 may perform the test operation based on the test input signal Test_i and may generate and output the test output signal Test_o including a result of performing the test operation.

In an example embodiment, the total number of devices under test included in the first test group 121_1 may be 2 k (k being a natural number) being an even number. In this case, the first devices under test DUT1 may include "k" devices under test, and the second devices under test DUT2 may include "k" devices under test. In some example embodiments, the first devices under test DUT1 may include odd-numbered devices under test among devices under test arranged in the first direction D1, and the second devices under test DUT2 may include even-numbered devices under test among the devices under test arranged in the first direction D1. However, the present disclosure is not limited thereto. For example, the arrangement of the first devices under test DUT1 and the second devices under test DUT2 may be variously changed or modified.

In an example embodiment, unlike the example illustrated in drawing, the number of devices under test included in the first test group 121_1 may be (2k−1) (k being a natural number) being an odd number. In this case, the first devices under test DUT1 may include "k" devices under test, and the second devices under test DUT2 may include (k−1) devices under test.

The plurality of load switches may include first load switches PLS1 and second load switches PLS2. The first load switches PLS1 may be connected with the first devices under test DUT1, respectively, and the second load switches PLS2 may be connected with the second devices under test DUT2, respectively. The first enable signal EN1 may be input to the first load switches PLS1, and the second enable signal EN2 may be input to the second load switches PLS2. The first load switches PLS1 may be set to the switch on state or the switch off state based on the first load switches PLS1, and the second load switches PLS2 may be set to the switch on state or the switch off state based on the second enable signal EN2.

The test operation may be performed in a first mode MODE1 where the first enable signal EN1 and the second enable signal EN2 are selectively activated or may be performed in a second mode MODE2 where the first enable signal EN1 and the second enable signal EN2 are simultaneously activated. How the load switches PLS1 and PLS2 and the devices under test DUT1 and DUT2 operate based on the first enable signal EN1 and the second enable signal EN2 will be described with reference to FIGS. 5 to 7.

Figure 5:
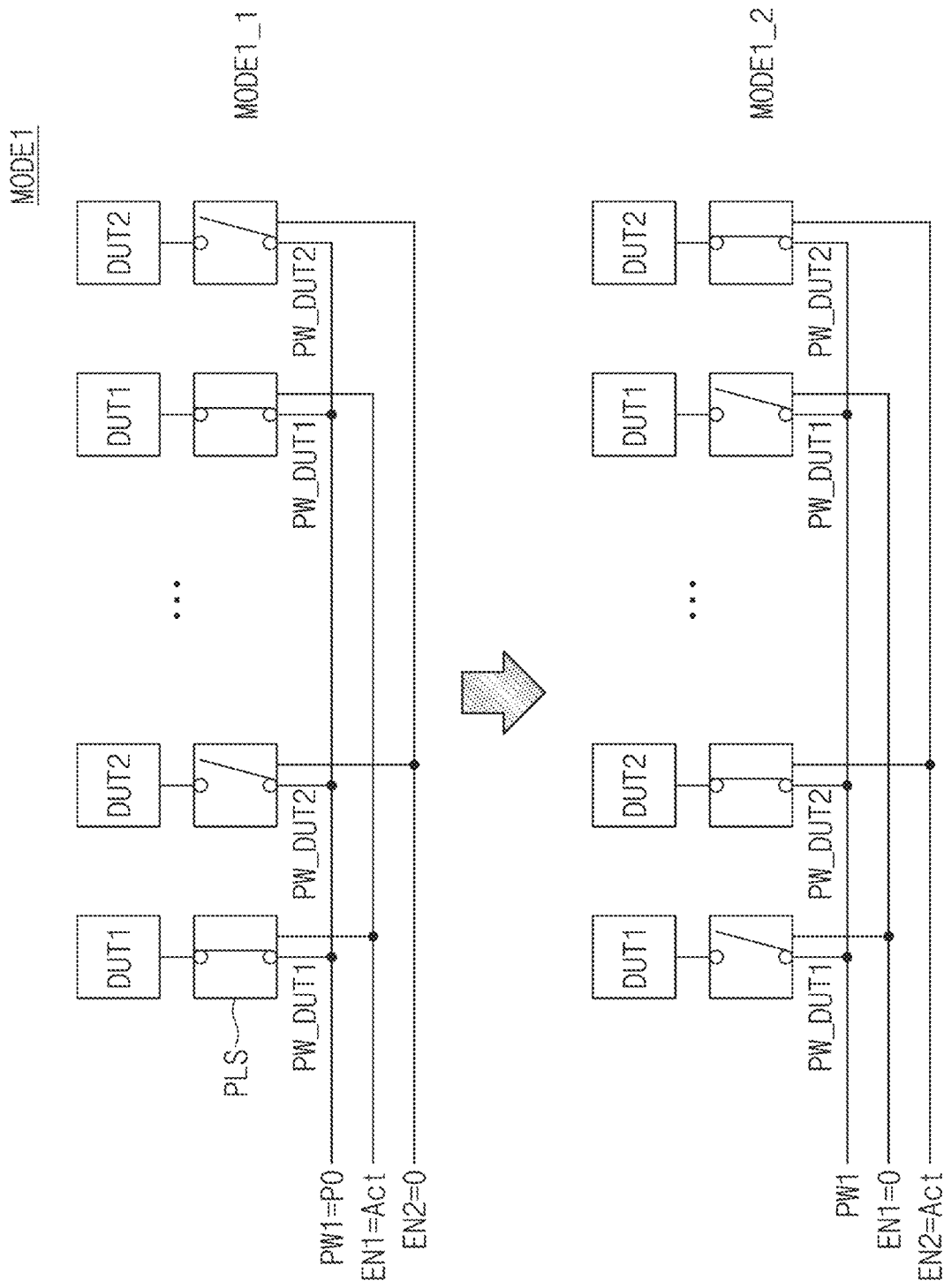
FIG. 5 is a circuit diagram illustrating an example where devices under test and load switches of the first test group of FIG. 4 perform a test operation in a first mode.
Figure 6:
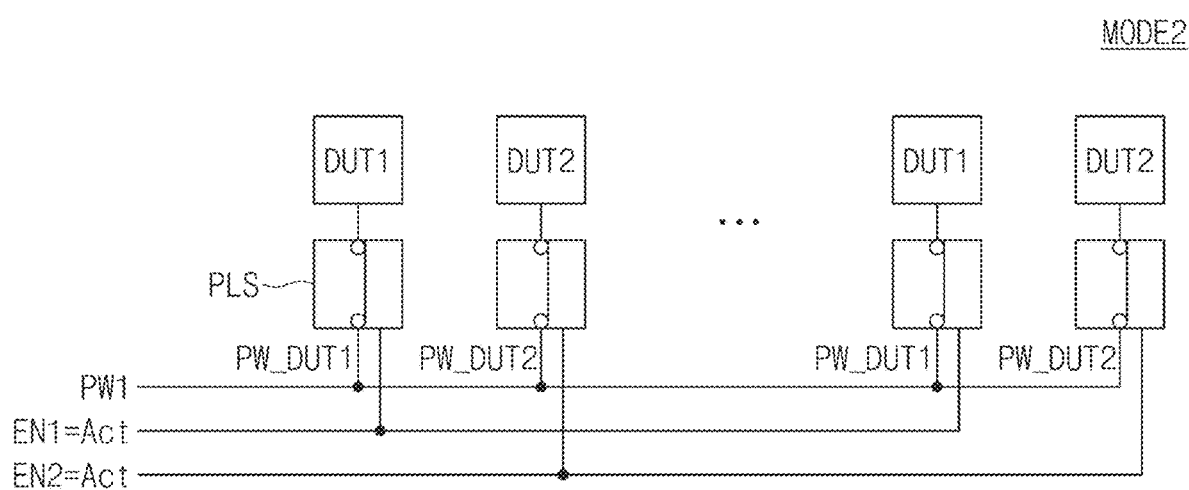
FIG. 6 is a circuit diagram illustrating an example where devices under test and load switches of the first test group of FIG. 4 perform a test operation in a second mode.

FIG. 5 is a circuit diagram illustrating an example where devices under test and load switches of the first test group of FIG. 4 perform a test operation in the first mode MODE1. FIG. 6 is a circuit diagram illustrating an example where devices under test and load switches of the first test group of FIG. 4 perform a test operation in the second mode MODE2.

Below, an example where the load switches PLS1 and PLS2 and the devices under test DUT1 and DUT2 operate the test operation in the first mode MODE1 or the second mode MODE2 based on the first enable signal EN1 and the second enable signal EN2 will be described in detail with reference to FIGS. 5 and 6.

Referring to FIG. 5 in conjunction with FIG. 2, in an example embodiment, the test controller 110 may perform the test operation on devices under test in the first mode MODE1.

In the first mode MODE1, the test controller 110 may perform the test operation on the devices under test while selectively activating the first enable signal EN1 and the second enable signal EN2. The performing of the test operation in the first mode MODE1 at the test controller 110 may include sequentially performing a (1-1)-th mode MODE1_1 and a (1-2)-th mode MODE1_2.

In the (1-1)-th mode MODE1_1, the test controller 110 may first perform the test operation on the first devices under test DUT1. In this case, the test controller 110 may activate the first enable signal EN1 and may deactivate the second enable signal EN2. As such, the first load switches PLS1 to which the first enable signal EN1 is provided may be set to the switch on state, and thus the supply power may be supplied to the first devices under test DUT1. The second load switches PLS2 to which the second enable signal EN2 is provided may be set to the switch off state, and thus the supply power may not be supplied to the second devices under test DUT2.

In the (1-1)-th mode MODE1_1, the first supply power PW_DUT1 that is supplied to each of the first devices under test DUT1 may have a magnitude that is determined (or obtained) by dividing a magnitude of a first test power PW1 output from the first power source 111_1 by the number of first devices under test DUT1.

After the test operation for the first devices under test DUT1 is completed in the (1-1)-th mode MODE1_1, the test controller 110 may perform the (1-2)-th mode MODE1_2 such that the same test operation is performed on the second devices under test DUT2.

In the (1-2)-th mode MODE1_2, the test controller 110 may first perform the test operation on the second devices under test DUT2. In this case, the test controller 110 may deactivate the first enable signal EN1 and may activate the second enable signal EN2. As such, the first load switches PLS1 to which the first enable signal EN1 is provided may be set to the switch off state, and thus the supply power may not be supplied to the first devices under test DUT1. The second load switches PLS2 to which the second enable signal EN2 is provided may be set to the switch on state, and thus the supply power may be supplied to the second devices under test DUT2.

In the (1-2)-th mode MODE1_2, the second supply power PW_DUT2 that is supplied to each of the second devices under test DUT2 may have a magnitude that is determined (or obtained) by dividing the magnitude of the test power PW1 output from the first power source 111_1 by the number of second devices under test DUT2.

When the number of second devices under test DUT 2 is equal to the number of first devices under test DUT1, the magnitude of the second supply power PW_DUT2 supplied to each of the second devices under test DUT2 may be equal to the magnitude of the first supply power PW_DUT1.

Referring to FIG. 6, in another example embodiment, the test controller 110 may perform the test operation on devices under test in the second mode MODE2.

In the second mode MODE2, the test controller 110 may perform the test operation on the devices under test while simultaneously activating the first enable signal EN1 and the second enable signal EN2.

In the second mode MODE2, the test operation may be simultaneously performed on the plurality of devices under test DUT1 and DUT2. In this case, the test controller 110 may simultaneously activate the first enable signal EN1 and the second enable signal EN2. As such, both the first load switches PLS1 and the second load switches PLS2 are set to the switch on state, and thus a second supply power having the same magnitude may be supplied to the first devices under test DUT1 and the second devices under test DUT2.

In the second mode MODE2, the second supply power that is supplied to the first devices under test DUT1 and the second devices under test DUT2 may have a magnitude that is determined (or obtained) by dividing the magnitude of the first test power PW1 output from the first power source 111_1 by the total number of first and second devices under test DUT1 and DUT2.

The magnitude of the first supply power provided to each of the first devices under test DUT1 (or the second devices under test DUT2) included in the first test group 121_1 when the test operation is performed in the first mode MODE1 may be greater than the magnitude of the second supply power provided to each of the first devices under test DUT1 when the test operation is performed in the second mode MODE2. For example, when the number of first devices under test DUT1 is equal to the number of second devices under test DUT2, the magnitude of the first supply power may be two times the magnitude of the second supply power.

According to the present disclosure, the test controller 110 may adjust the magnitude of the supply power to be supplied to each device under test by controlling the enable signals. However, the present disclosure is not limited thereto. For example, as a third enable signal is added and the test operation is performed in a state where a plurality of devices under test are divided into three groups, the magnitude of the supply power may be increased three times (e.g., may have three different magnitudes). In addition, when an enable signal is further added, the magnitude of the supply power per device under test may be further increased. According to the present disclosure, even though power consumption in the test operation increases, the number of device under test capable of being mounted on the test board may increase. This may mean that the degree of integration of the test board is improved.

According to the present disclosure, the test operation may be performed in the first mode where some of a plurality of devices under test on the test board are first tested based on power consumption per device under test or may be performed in the second mode where the plurality of devices under test are simultaneously tested.

According to the present disclosure, the test operation may be performed in the first mode where some of the plurality of devices under test are first tested depending on test items of the test operation or may be performed in the second mode where the plurality of devices under test are simultaneously tested.

The test operation that is performed by using the test board according to the present disclosure will be described with reference to FIGS. 9 to 13.

Figure 7:
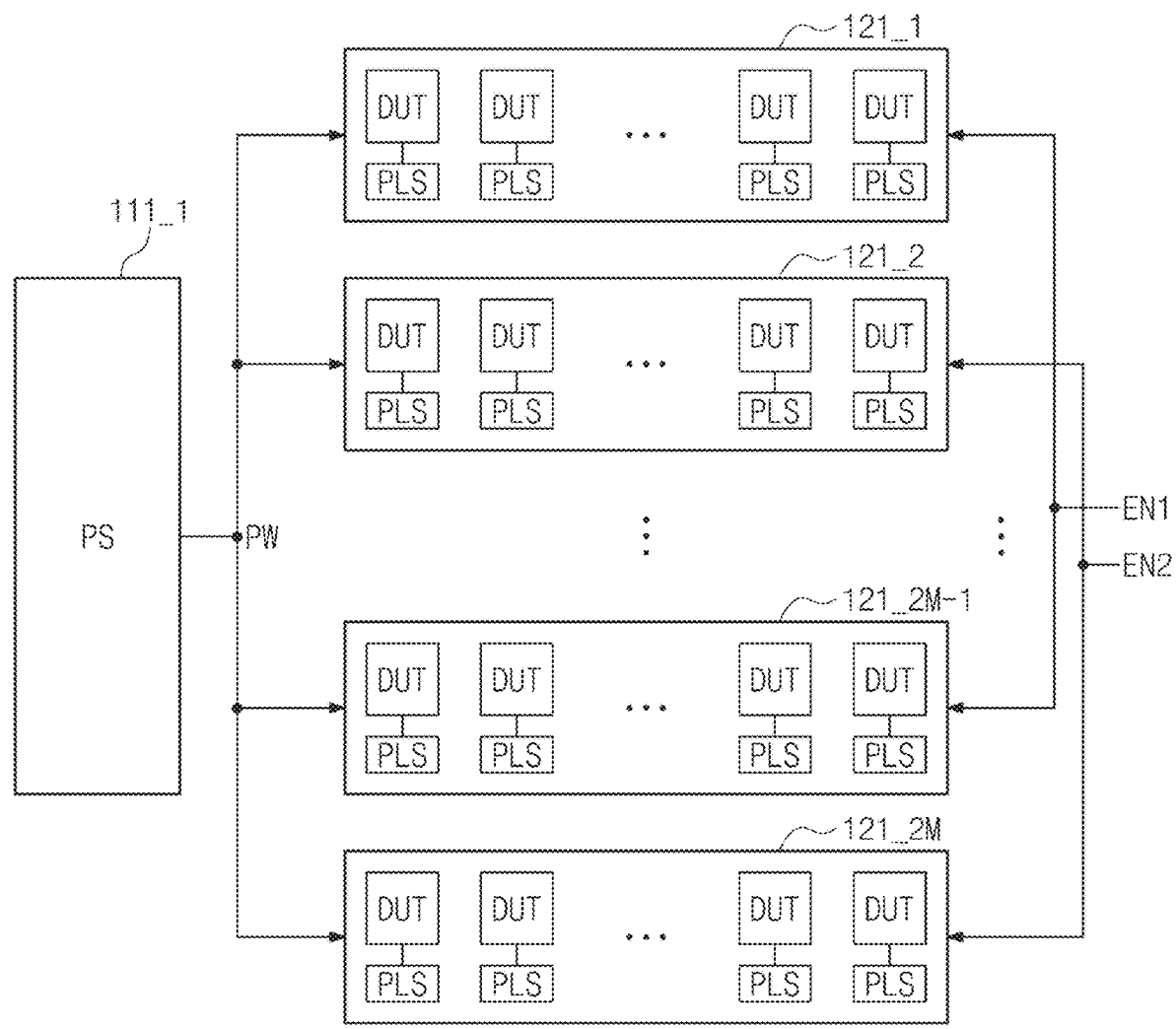
FIG. 7 is a diagram illustrating a plurality of test groups supplied with a power from a power source in FIG. 2, according to another example embodiment of the present disclosure.
Figure 8:
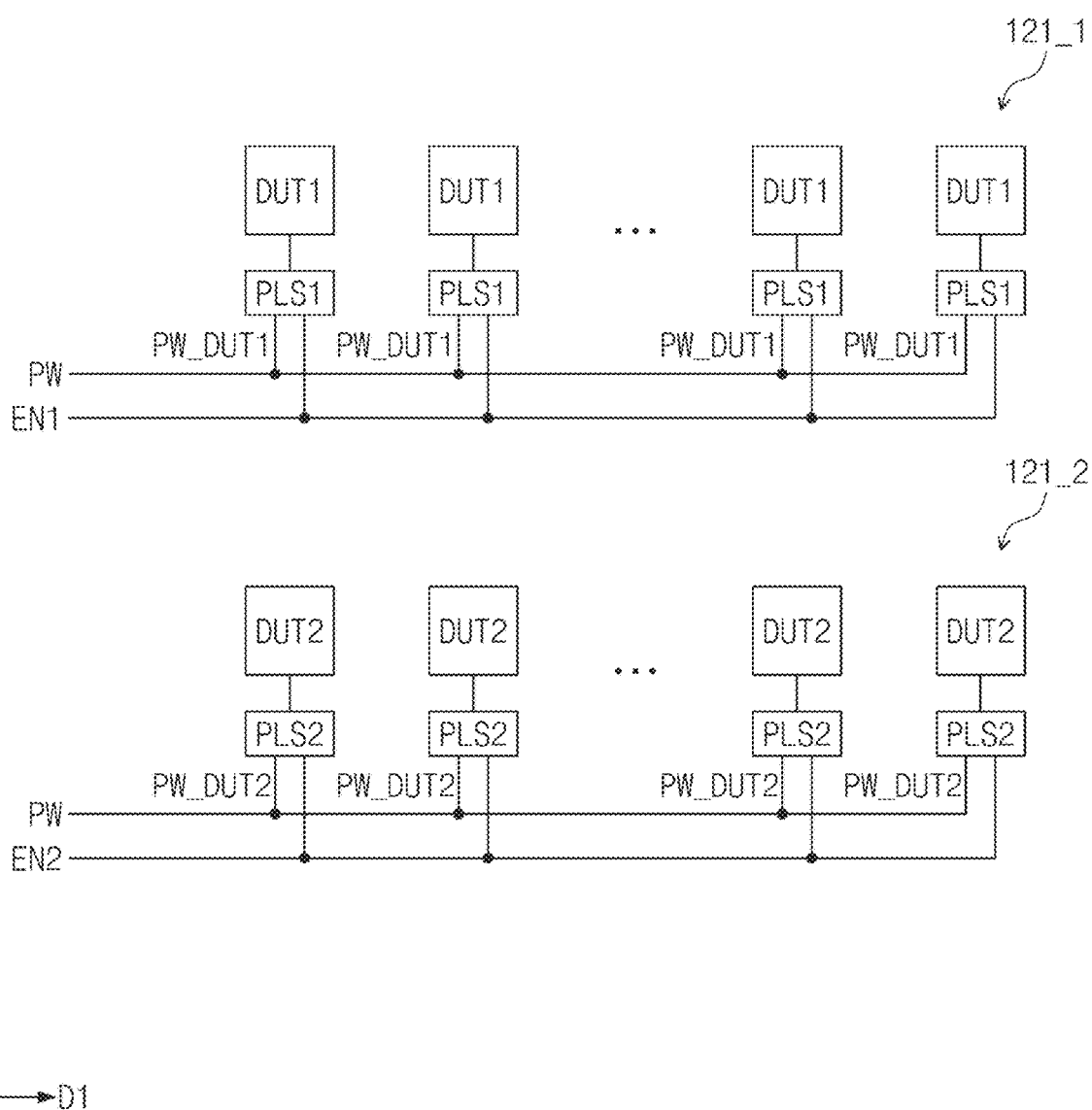
FIG. 8 is a diagram for describing how a supply power is provided to devices under test of a first test group and a second test group of FIG. 7.

FIG. 7 is a diagram illustrating a plurality of test groups supplied with a power from a power source in FIG. 2, according to another example embodiment of the present disclosure. FIG. 8 is a diagram for describing how a supply power is provided to devices under test of a first test group and a second test group of FIG. 7. Below, a difference between the example embodiment of FIGS. 3 and 4 and the example embodiment of FIGS. 7 and 8 will be described in detail.

In an example embodiment, the power controller 111 may include the first power controller 111_1, and the test power PW generated from the first power controller 111_1 may be distributed (or branched) and supplied to the plurality of test groups.

The plurality of test groups may include the first test group 121_1, the second test group 121_2, . . . , the (2M−1)-th test group 121_2M−1 (M being a natural number of 1 or more), and the 2M-th test group 121_2M.

Odd-numbered test groups may include the first load switches PLS1 and the first devices under test DUT1. For example, the first test group 121_1, the third test group 121_3, . . . , the (2M−1)-th test group 121_2M−1 may include the first load switches PLS1 and the first devices under test DUT1. The first enable signal EN1 may be provided to the first load switches PLS1.

Even-numbered test groups may include the second load switches PLS2 and the second devices under test DUT2. For example, the second test group 121_2, the fourth test group 121_4, . . . , the 2M-th test group 121_2M may include the second load switches PLS2 and the second devices under test DUT2. The second enable signal EN2 may be provided to the second load switches PLS2.

When the supply power is provided, the first devices under test DUT1 and the second devices under test DUT2 may perform the test operation based on the test input signal Test_i and may generate and output the test output signal Test_o including a result of performing the test operation.

The test operation may be performed in the first mode MODE1 where the first enable signal EN1 and the second enable signal EN2 are selectively activated or may be performed in the second mode MODE2 where the first enable signal EN1 and the second enable signal EN2 are simultaneously activated.

In the first mode MODE1, the test controller 110 may perform the test operation on the devices under test while selectively activating the first enable signal EN1 and the second enable signal EN2. The performing of the test operation in the first mode MODE1 at the test controller 110 may include sequentially performing the (1-1)-th mode MODE1_1 and the (1-2)-th mode MODE1_2, as illustrated in FIG. 5.

After the test operation for the first devices under test DUT1 is completed in the (1-1)-th mode MODE1_1, the test controller 110 may perform the (1-2)-th mode MODE1_2 such that the same test operation is performed on the second devices under test DUT2.

In the second mode MODE2, the test controller 110 may perform the test operation on the devices under test while simultaneously activating the first enable signal EN1 and the second enable signal EN2.

Figure 9:
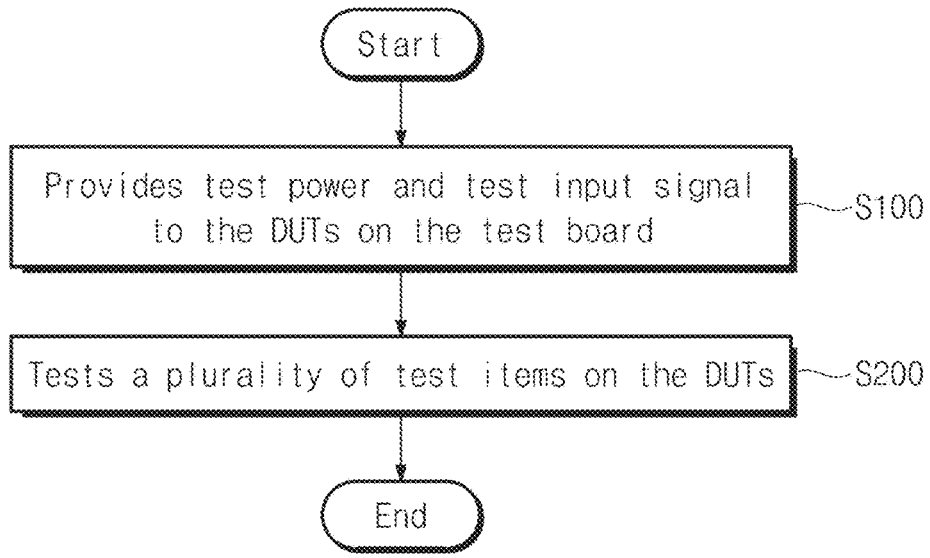
FIG. 9 is a flowchart for describing a test method using a test board according to an example embodiment of the present disclosure.
Figure 10:
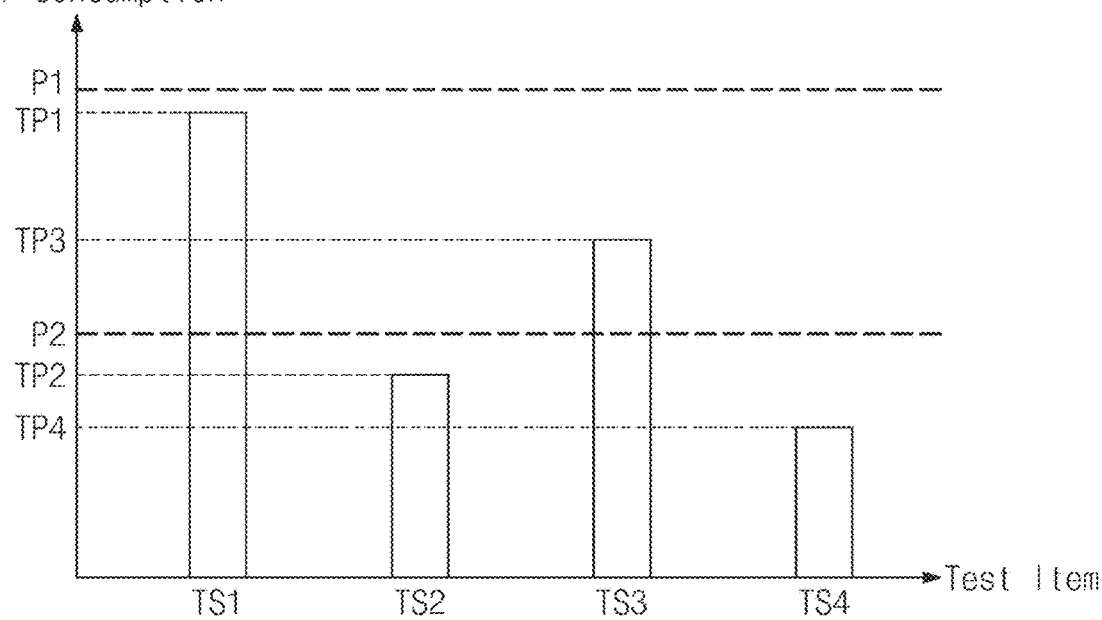
FIG. 10 is a diagram for describing first to fourth test items as an example of a plurality of test items of FIG. 9.
Figure 11:
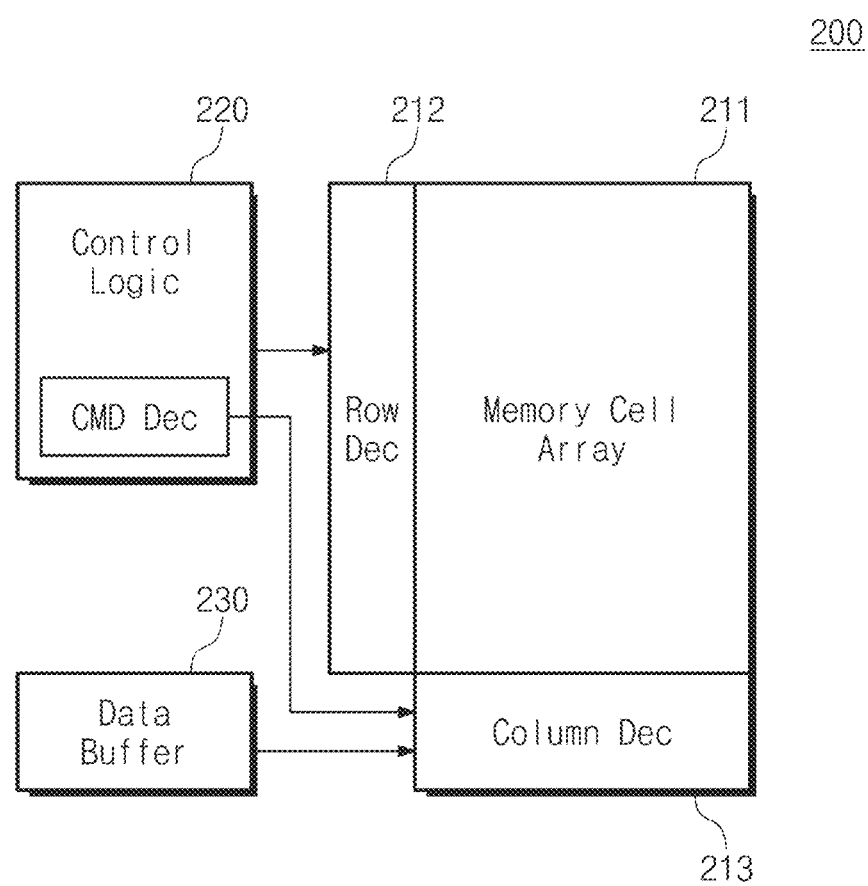
FIG. 11 is a diagram illustrating a memory device as an example of a semiconductor device included in a device under test.
Figure 12:
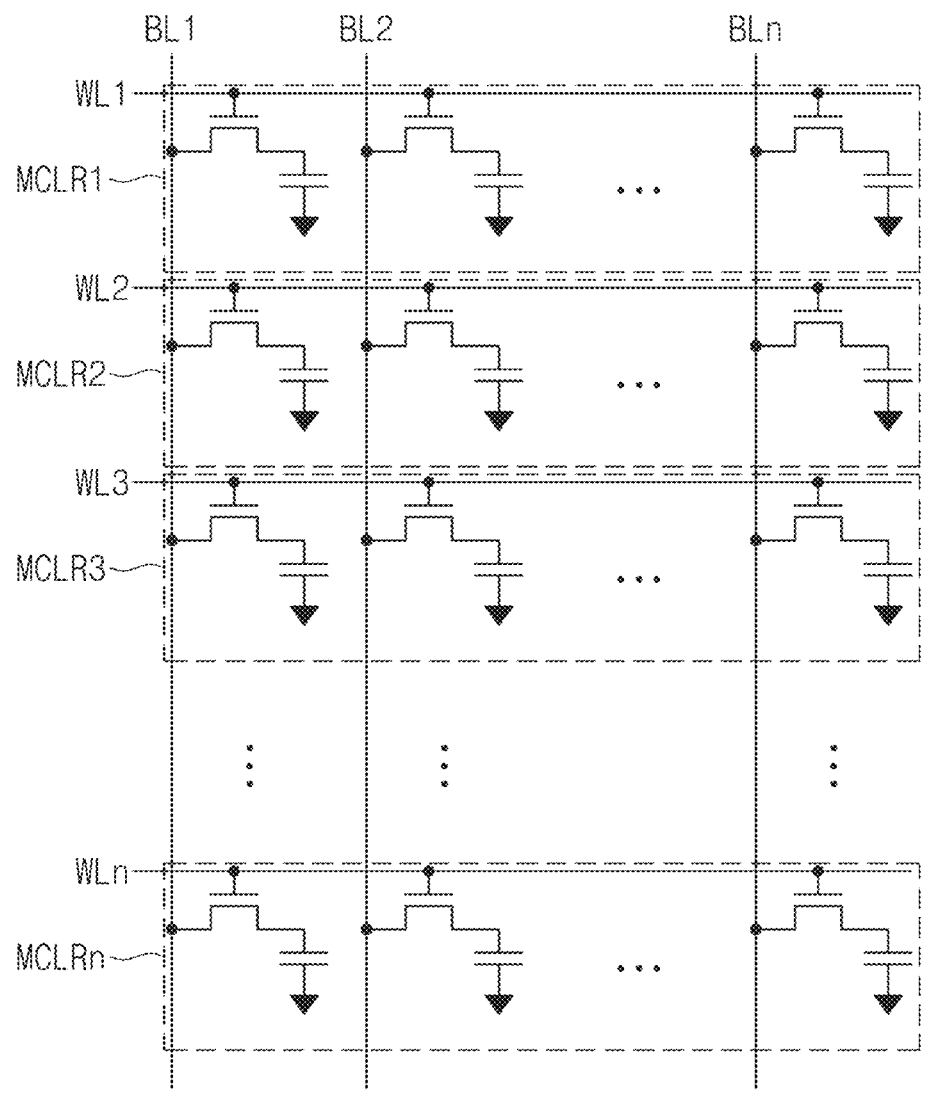
FIG. 12 is a diagram illustrating an example of a memory cell array of a memory device of FIG. 11.

FIG. 9 is a flowchart for describing a test method using a test board according to an example embodiment of the present disclosure. FIG. 10 is a diagram for describing first to fourth test items as an example of a plurality of test items of FIG. 9. FIG. 11 is a diagram illustrating a memory device as an example of a semiconductor device included in a device under test. FIG. 12 is a diagram illustrating an example of a memory cell array of a memory device of FIG. 11. Below, a semiconductor device test method using a test board according to an example embodiment of the present disclosure will be described in detail with reference to FIGS. 9 to 12.

According to a semiconductor device test method using the test board 10 of an example embodiment of the present disclosure, whether semiconductor devices included in the devices under test DUT are defective may be determined by using the test board 10 described with reference to FIGS. 1 to 8. Below, the description will be given together with reference to the description of the test board 10 given with reference to FIGS. 1 to 6.

Referring to FIGS. 1 to 3 together, the test controller 110 of the test board 10 may perform the test operation on the devices under test DUT by generating the test powers PW1 to PWN and controlling the enable signals EN1 and EN2. The test controller 110 may include the plurality of power sources 111_1, 111_2, . . . , 111_N, each of which is configured to provide a supply power to the devices under test DUT included in a corresponding test group. Below, how to perform the test operation on the first test group 121_1 connected with the first power controller 111_1 will be described.

Referring to FIGS. 2 and 9, in operation S100, the test controller 110 may generate the test power and may provide the supply power to the devices under test DUT on the test board 10. In operation S100, the test controller 110 of the test board 10 may generate the test power and the test input signal Test_i, the test power may be provided to the plurality of load switches PLS, and the test input signal Test_i may be provided to the plurality of devices under test DUT.

In operation S200, the devices under test DUT on the test board 10 may be tested for each of test items. When the test operation is performed for each test item, the test controller 110 may control the enable signals EN1 and EN2 such that the test operation is performed on the devices under test DUT, with the load switches PLS selectively set to the switch on state.

In an example embodiment, the test controller 110 may operate in the first mode MODE1, in which the test operation is performed on the first devices under test DUT1 and is then performed on the second devices under test DUT2.

In another example embodiment, the test controller 110 may operate in the second mode MODE2, in which the test operation is simultaneously performed on the first devices under test DUT1 and the second devices under test DUT2.

In operation S200, the semiconductor device test method according to an example embodiment of the present disclosure may include sequentially performing the test operations for first to fourth test items TS1, TS2, TS3, and TS4. The amount of power consumed per device under test may be identical in each test item or may vary depending on test items. However, the present disclosure is not limited thereto. Kinds and the number of test items may increase or decrease.

For example, referring to FIG. 10, in the case of the first test item TS1, first power consumption TP1 may be required or desired per device under test DUT. In this case, a magnitude of the first power consumption TP1 may be greater than a magnitude of a second supply power P2 and may be smaller than a magnitude of a first supply power P1. In the case of the second test item TS2, second power consumption TP2 may be required or desired per device under test DUT. In this case, a magnitude of the second power consumption TP2 may be smaller than the magnitude of the second supply power P2. In the case of the third test item TS3, third power consumption TP3 may be required or desired per device under test DUT. In this case, a magnitude of the third power consumption TP3 may be greater than the magnitude of the second supply power P2 and may be smaller than the magnitude of the first supply power P1. In the case of the fourth test item TS4, fourth power consumption TP4 may be required or desired per device under test DUT. In this case, a magnitude of the fourth power consumption TP4 may be smaller than the magnitude of the second supply power P2.

The power consumption per device under test may vary depending on a kind of a device under test or a kind of a test item. Below, examples of a kind of a test item, for example, a memory device as an example of a semiconductor device included in a device under test will be described with reference to FIGS. 11 and 12.

Referring to FIG. 11, the semiconductor device included in the device under test may be a memory device 200.

The memory device 200 may include a memory cell array 211, a row decoder 212, and a column decoder 213 for the purpose of a memory operation of storing or reading data, and may further include control logic 220 controlling overall internal operations of the memory device 200 and a data buffer 230 temporarily storing input/output data.

Referring to FIG. 12, the memory cell array 211 may include a plurality of bit lines BL1 to BLn, a plurality of word lines WL1 to WLn, and a plurality of memory cells. The memory cell array 211 may include a plurality of memory cell rows MCLR1 to MCLRn. For example, the memory cell array 211 may include the first to n-th word lines WL1 to WLn, and the plurality of memory cell rows may include the first to n-th memory cell rows MCLR1 to MCLRn, and memory cells included in each of the first to n-th memory cell rows MCLR1 to MCLRn may share the same word line.

The control logic 220 may control the memory operation depending on the test input signal Test_i received from the test controller 110. For example, the control logic 220 may receive an address signal from the test controller 110, may provide the row decoder 212 with a row address signal for selecting word lines of the memory cell array 211, and may provide the column decoder 213 with a column address signal for selecting bit lines of the memory cell array 211.

The control logic 220 may further include a command decoder CMD Dec that decodes a command from the test controller 110 and controls an internal operation of the memory device 200.

Meanwhile, a semiconductor device where the test is to be performed may be the memory device 200. According to an example embodiment of the present disclosure, information corresponding to the command/address signal from the test controller 110 may be provided to the memory device 200 as the test input signal Test_i, and information corresponding to the data may be provided to the memory device 200 as the test input signal Test_i.

In an example embodiment, a supply power that is provided from load switches may be used as an operating voltage of an internal target circuit of the memory device 200 as an input power.

The memory device 200 may receive the test input signal Test_i from the test controller 110, may perform the test operation for each test item, and may generate the test output signal Test_o as a result of the test operation so as to be provided to the test controller 110.

Different kinds of tests may be performed on the memory device 200 depending on test items. The power consumption of the memory device 200 required or desired in the test operation may vary depending on the test items.

For example, a first test item may include a programming test for the plurality of memory cell rows of the memory cell array 211. When the test for the first test item is performed, the test input signal Test_i may include the row address signal for selecting a plurality of word lines.

For another example, a second test item may include a programming test for a specific memory cell row among the plurality of memory cell rows of the memory cell array 211. When the test for the second test item is performed, the test input signal Test_i may include the address signal for selecting a specific word line.

The above kinds of test items may be provided only as an example. Test items according to some example embodiments may include various kinds of tests associated with the operation of the memory device in addition to the programming test. Test items according to some example embodiments may include various kinds of tests for semiconductor devices as well as the memory device.

Figure 13:
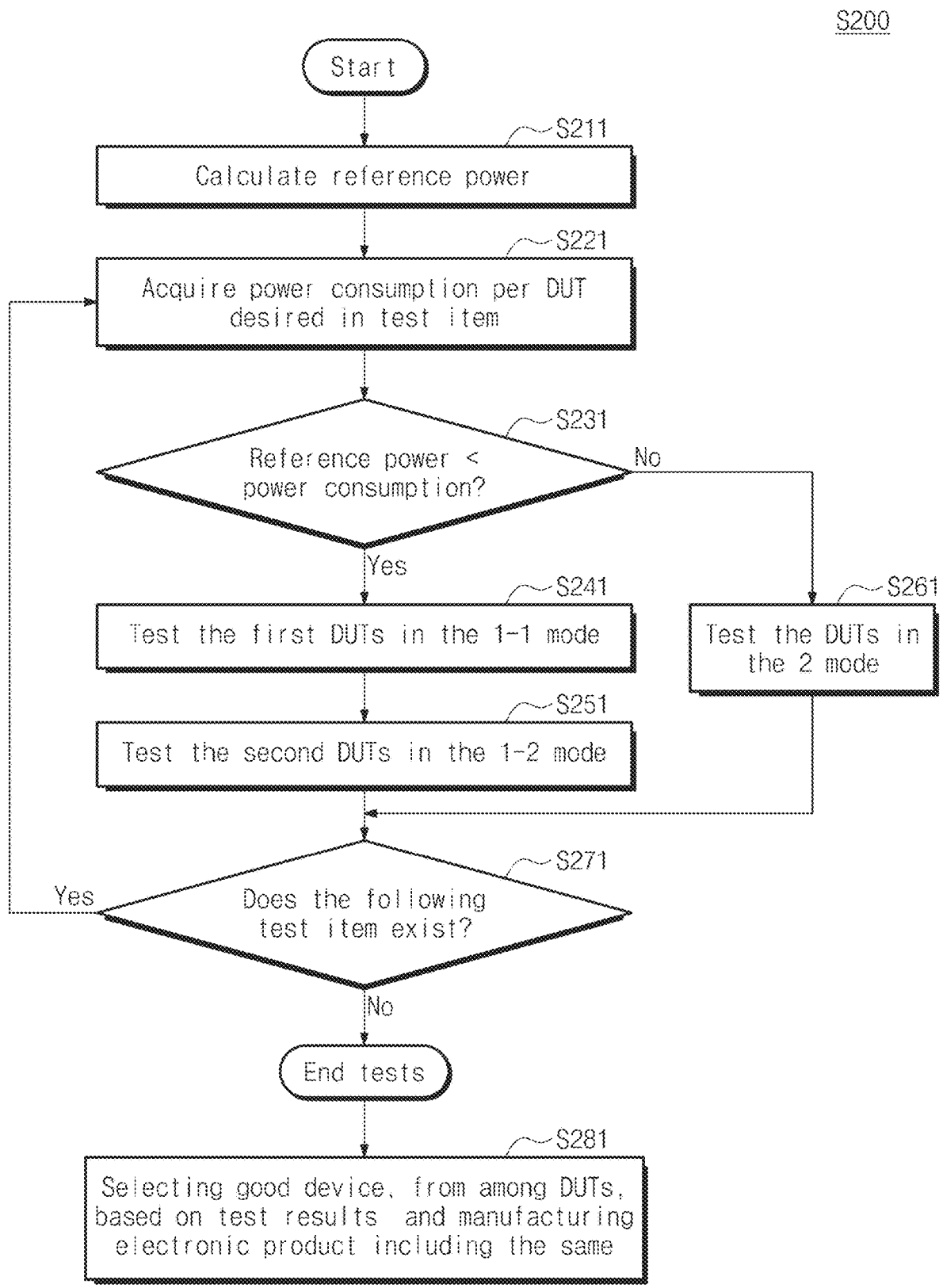
FIG. 13 is a flowchart illustrating a method of performing a test operation based on power consumption of a device under test for each test item in operation S200 of FIG. 9, according to an example embodiment of the present disclosure.
Figure 14:
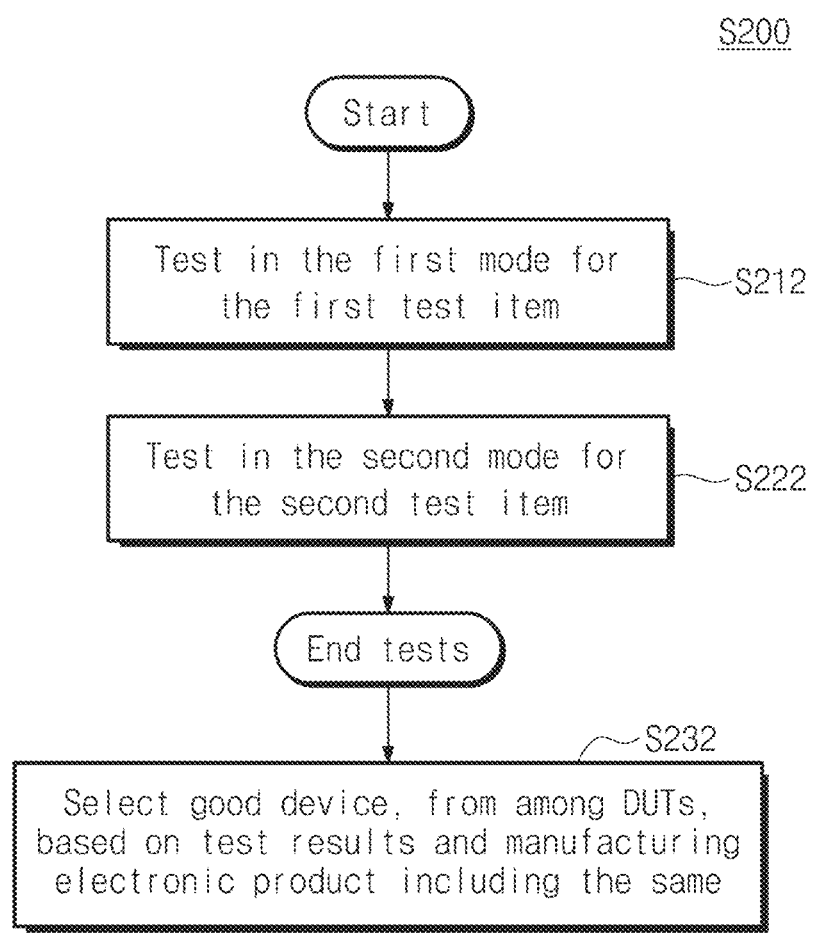
FIG. 14 is a flowchart illustrating a method of performing a test operation based on a kind of a test item in operation S200 of FIG. 9, according to an example embodiment of the present disclosure.
Figure 15:
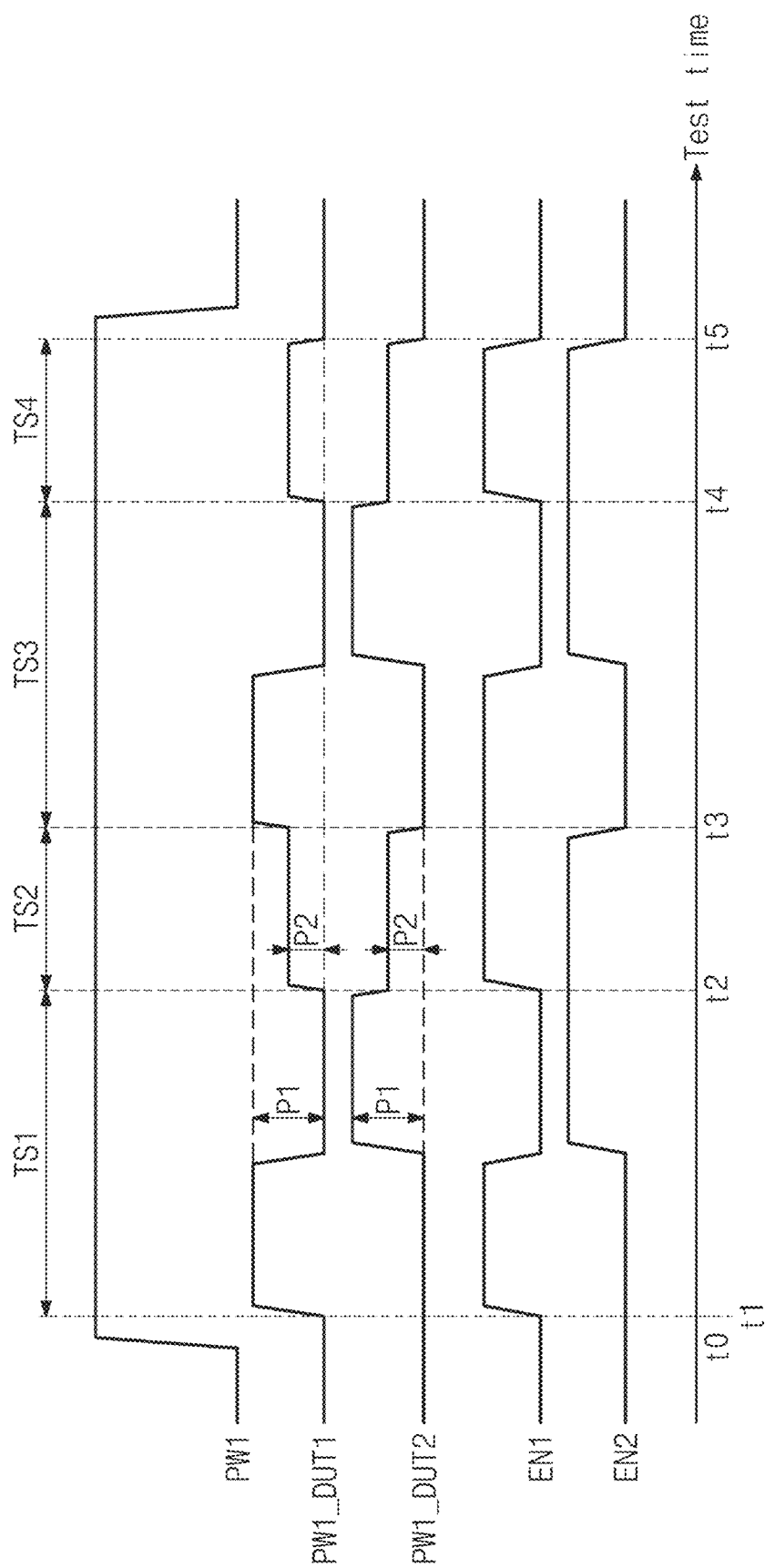
FIG. 15 is a timing diagram illustrating an example of a process where a test operation is performed sequentially depending on test items of FIG. 10.

FIG. 13 is a flowchart illustrating a method of performing a test operation based on power consumption of a device under test for each test item in operation S200 of FIG. 9, according to an example embodiment of the present disclosure. FIG. 14 is a flowchart illustrating a method of performing a test operation based on a kind of a test item in operation S200 of FIG. 9, according to an example embodiment of the present disclosure. FIG. 15 is a timing diagram illustrating an example of a process where a test operation is performed sequentially depending on test items of FIG. 10. Below, an example embodiment where the test operation is performed for each test item will be described with reference to FIGS. 13 to 15.

Referring to FIG. 13, in an example embodiment, the test controller 110 may operate in the first mode MODE1 or the second mode MODE2 based on the power consumption of a device under test DUT for each test item and may perform the test operation for each test item.

Referring to FIG. 13, in operation S211, the test controller 110 may calculate a reference power. The reference power may be a minimum supply power for each device under test, which is provided from a power source. The minimum supply power may be defined as a power to be supplied for each device under test in a state where all load switches connected with devices under test are set to the switch on state.

For example, referring to FIG. 4, the minimum supply power may have a magnitude that is determined by dividing the magnitude of the first test power PW1 from the first power controller 111_1 by the total number of first and second devices under test DUT1 and DUT2.

In operation S221, the power consumption for each device under test may be obtained in the test for each test item. The power consumption for each device under test may be obtained by measuring the power consumption of the device under test through the test operation for the test item performed in advance.

In operation S231, the test controller 110 may compare the magnitude of the reference power and the magnitude of the power consumption. When the magnitude of the reference power is smaller than the magnitude of the power consumption, the test controller 110 may perform operation S241 and operation S251. When the magnitude of the reference power is greater than the magnitude of the power consumption, the test controller 110 may perform operation S261.

When the magnitude of the minimum supply power is smaller than the magnitude of the power consumption, in operation S241, the test controller 110 may first perform the test item-based test operation on the first devices under test DUT1. The switch controller 113 of the test controller 110 may operate in the (1-1)-th mode MODE1_1 in which the first enable signal EN1 is activated and the second enable signal EN2 is deactivated. In this case, only the first load switches PLS1 to which the first enable signal EN1 is provided may be set to the switch on state, and thus the first supply power may be provided to the first devices under test DUT1. That is, the test operation may be first performed on the first devices under test DUT1.

After the test operation for the first devices under test DUT1 is completed, in operation S251, the test controller 110 may perform the test item-based test operation on the second devices under test DUT2. The switch controller 113 of the test controller 110 may operate in the (1-2)-th mode MODE1_2 in which the second enable signal EN2 is activated and the first enable signal EN1 is deactivated. In this case, the second load switches PLS2 to which the second enable signal EN2 is provided may be set to the switch on state, and thus the first supply power may be provided to the second devices under test DUT2. That is, the test operation may be performed on the second devices under test DUT2.

When the magnitude of the minimum supply power is greater than the magnitude of the power consumption, in operation S261, the switch controller 113 of the test controller 110 may operate in the second mode MODE2 in which the first enable signal EN1 and the second enable signal EN2 are simultaneously activated. In this case, both the first load switches PLS1 and the second load switches PLS2 may be set to the switch on state, and thus the second supply power may be supplied to the first devices under test DUT1 and the second devices under test DUT2. This may mean that the test operation is simultaneously performed on the first devices under test DUT1 and the second devices under test DUT2.

The magnitude of the supply power (e.g., the first supply power) supplied for each device under test in operation S241 and operation S251 may be greater than the magnitude of the supply power (e.g., the second supply power) supplied for each device under test in operation S261. For example, the magnitude of the first supply power may be two times the magnitude of the second supply power.

In operation S271, the test controller 110 may be configured to determine whether a next test item exists. When a next test item exists, operation S222 to operation S261 may be repeatedly performed until the test for all the test items is completed. When a next test item does not exist, the test may end.

In operation S281, which is an optional operation, one or more good devices, may be selected from among the first and second devices under test DUT1 and DUT2 based on the test results, and an electronic product including at least one of the selected good devices may be manufactured. In some example embodiments, some of the first and second devices other than the one or more good devices may be salvaged and used to manufacture an electronic product, which has relatively loose requirements for the device.

Referring to FIG. 14, in an example embodiment, the test controller 110 may operate in the first mode MODE1 or the second mode MODE2 based on a test item kind and may perform the test operation for a test item.

In operation S212, the test controller 110 may perform the test operation for the first test item in the first mode MODE1. The first test item may include, for example, a programming test for a plurality of memory cell rows of the memory cell array 211.

When an address signal for the plurality of memory cell rows is included in the test input signal Test_i, the test controller 110 may perform the test operation for the first test item in the first mode MODE1. In this case, the test controller 110 may operate in the (1-1)-th mode MODE1_1 in which the programming test is performed on the first devices under test DUT1 and may then operate in the (1-2)-th mode MODE1_2 in which the programming test is performed on the second devices under test DUT2.

In operation S222, the test controller 110 may perform the test operation for the second test item in the second mode MODE2. The second test item may include, for example, a programming test for one of the plurality of memory cell rows of the memory cell array 211 of the semiconductor memory.

When an address signal for a specific memory cell row is included in the test input signal Test_i, the test controller 110 may perform the test operation for the second test item in the second mode MODE2. In this case, the test controller 110 may operate in the second mode MODE2 in which the programming test is simultaneously performed on the first devices under test DUT1 and the second devices under test DUT2.

After operations S212 and S222 end (e.g., after the tests end), in operation S232, which is an optional operation, one or more good devices may be selected from among the first and second devices under test DUT1 and DUT2 based on the test results, and an electronic product including at least one of the selected good devices may be manufactured. In some example embodiments, some of the first and second devices other than the one or more good devices may be salvaged and used to manufacture an electronic product, which has relatively loose requirements for the device.

However, the present disclosure is not limited to the above examples. For example, with regard to a third test item and a fourth test item, the test controller 110 may perform the test operation in the first mode MODE1 or the second mode MODE2 based on a kind of a test item (or based on the test input signal Test_i).

Referring to FIG. 15, in operation S200 of FIG. 9, the test operation may be performed sequentially for the first to fourth test items TS1, TS2, TS3, and TS4. In each test, the first supply power P1 may be defined as a power that is supplied to a device under test in the first mode MODE1 in which only one of the first enable signal EN1 or the second enable signal EN2 is activated, and the second supply power P2 may be defined as a power that is supplied to a device under test in the second mode MODE2 in which both the first enable signal EN1 and the second enable signal EN2 are activated. The second supply power P2 may be a minimum supply power that is supplied to a device under test.

At a 0-th time t0, the first test power PW1 may be output from the first power source 111_1, and the enable signals EN1 and EN2 that are provided to the load switches PLS1 and PLS2 may be in a deactivated state.

At a first time t1, the test for the first test item TS1 may start. In the case of the first test item TS1, because the magnitude of the first power consumption TP1 of the device under test is greater than the magnitude of the second supply power P2, the test operation may be performed on the first devices under test DUT1, and then the test operation may be performed on the second devices under test DUT2.

First, the test for the first test item TS1 may be performed on the first devices under test DUT1. In this case, the first enable signal EN1 may be activated, and the second enable signal EN2 may be deactivated. the first supply power P1 may be supplied to the first devices under test DUT1.

Then, the test for the first test item TS1 may be performed on the second devices under test DUT2. In this case, the first enable signal EN1 may be deactivated, and the second enable signal EN2 may be activated. the first supply power P1 may be supplied to the second devices under test DUT2.

At the second time t2, the test for the second test item TS2 may start. In the case of the second test item TS2, because the magnitude of the second power consumption TP2 of the device under test is smaller than the magnitude of the second supply power P2, the test operation may be simultaneously performed on the first devices under test DUT1 and the second devices under test DUT2.

During a time period from t2 to t3, the test for the second test item TS2 may be performed on the first devices under test DUT1 and the second devices under test DUT2. In this case, both the first enable signal EN1 and the second enable signal EN2 may be activated. During the time period from t2 to t3, the second supply power P2 may be supplied to the first devices under test DUT1 and the second devices under test DUT2.

The magnitude of the first supply power P1 may be greater than the magnitude of the second supply power P2. For example, the magnitude of the first supply power P1 may be two times the magnitude of the second supply power P2.

At the third time t3, the test for the third test item TS3 may start. In the case of the third test item TS3, because the magnitude of the third power consumption TP3 of the device under test is greater than the magnitude of the second supply power P2, the test operation may be performed on the first devices under test DUT1, and then, the test operation may be performed on the second devices under test DUT2.

First, the test for the third test item TS3 may be performed on the first devices under test DUT1. In this case, the first enable signal EN1 may be activated, and the second enable signal EN2 may be deactivated. the first supply power P1 may be supplied to the first devices under test DUT1.

Then, the test for the third test item TS3 may be performed on the second devices under test DUT2. In this case, the first enable signal EN1 may be deactivated, and the second enable signal EN2 may be activated. the first supply power P1 may be supplied to the second devices under test DUT2.

At a fourth time t4, the test for the fourth test item TS4 may start. In the case of the fourth test item TS4, because the magnitude of the fourth power consumption TP4 of the device under test is smaller than the magnitude of the second supply power P2, the test operation may be simultaneously performed on the first devices under test DUT1 and the second devices under test DUT2.

During a time period from t4 to t5, the test for the fourth test item TS4 may be performed on the first devices under test DUT1 and the second devices under test DUT2. In this case, both the first enable signal EN1 and the second enable signal EN2 may be activated. During the time period from t4 to t5, the second supply power P2 may be supplied to the first devices under test DUT1 and the second devices under test DUT2.

According to an example embodiment of the present disclosure, a test board with the improved degree of integration and improved productivity is provided.

According to an example embodiment of the present disclosure, a test board capable of providing an improved supply power when a test operation is performed on a device under test is provided.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A test board comprising:
   a substrate including a device under test (DUT) placement area where a plurality of first devices under test and a plurality of second devices under test are disposed;
   a plurality of first load switches connected in series with the plurality of first devices under test, respectively, and configured to be set to a switch on state or a switch off state based on a first enable signal;
   a plurality of second load switches connected in series with the plurality of second devices under test, respectively, and configured to be set to the switch on state or the switch off state depending on a second enable signal; and
   a test controller,
   wherein the test controller is configured to
      calculating a minimum supply power to be supplied to each of the plurality of first devices under test and the plurality of second devices under test as a reference power,
      obtain power consumption for each of the plurality of first devices under test and the plurality of second devices under test through a test operation in advance,
      when the power consumption is greater than the reference power, perform the test operation in a (1-1)-th mode by activating the first enable signal and deactivating the second enable signal and then perform the test operation in a (1-2)-th mode by deactivating the first enable signal and activating the second enable signal, and
      when the power consumption is smaller than the reference power, simultaneously performing the test operation on the plurality of first devices under test and the plurality of second devices under test in a second mode where the first enable signal and the second enable signal are simultaneously activated,
   wherein the test controller includes a power source configured to generate a test power and provide the power source to the plurality of first load switches and the plurality of second load switches, when the test operation is performed,
   wherein in the (1-1)-th mode, the plurality of first load switches are configured to be set to the switch on state and the plurality of second load switches are configured to be set to the switch off state, to perform the test operation on the plurality of first devices under test, and
   wherein in the (1-2)-th mode, the plurality of first load switches are configured to be set to the switch off state and the plurality of second load switches are configured to be set to the switch on state, to perform the test operation on the plurality of second devices under test.

2. The test board of claim 1, wherein the power source is configured to distribute and provide the test power to the plurality of first load switches and the plurality of second load switches.

3. The test board of claim 2, wherein
   in the (1-1)-th mode, a first supply power is configured to be supplied from the plurality of first load switches to corresponding ones of the plurality of first devices under test, respectively, and is not configured to be supplied to the plurality of second devices under test, and
   in the (1-2)-th mode, a second supply power is configured to be supplied from the plurality of second load switches to corresponding ones of the plurality of second devices under test, respectively, and is not configured to be supplied to the plurality of first devices under test.

4. The test board of claim 3, wherein in the second mode, a third supply power is supplied from the plurality of first load switches to corresponding ones of the plurality of first devices under test, respectively, and from the plurality of second load switches to corresponding ones of the plurality of second devices under test, respectively.

5. The test board of claim 4, wherein a magnitude of the first supply power is greater than a magnitude of the third supply power.

6. The test board of claim 5, wherein the magnitude of the first supply power is two times the magnitude of the third supply power.

7. The test board of claim 1, wherein the test controller is configured to:
   generate and provide a test input signal to the plurality of first devices under test and the plurality of second devices under test; and
   receive a test output signal output from each of the plurality of first devices under test and the plurality of second devices under test to generate test data including a test result.

8. The test board of claim 7, wherein the test controller is configured to sequentially operate in the (1-1)-th mode and the (1-2)-th mode based on the test input signal.

9. The test board of claim 1, wherein the test controller is configured to sequentially operate in the (1-1)-th mode and the (1-2)-th mode based on power consumption for each of the first devices under test and the second devices under test when the test operation is performed.

10. A test method using a test board configured to perform a test operation for a first test item with respect to a plurality of first devices under test and a plurality of second devices under test, the method comprising:
calculating a minimum supply power to be supplied to each of the plurality of first devices under test and the plurality of second devices under test as a reference power;
obtaining power consumption for each of the plurality of first devices under test and the plurality of second devices under test through the test operation in advance;
when the power consumption is greater than a reference power, performing the test operation for the first test item in a (1-1)-th mode by activating a first enable signal provided to a plurality of first load switches connected with the plurality of first devices under test, respectively, and deactivating a second enable signal provided to a plurality of second load switches connected with the plurality of second devices under test, respectively, and performing the test operation for the first test item in a (1-2)-th mode by deactivating the first enable signal and activating the second enable-signal, signal; and
when the power consumption is smaller than the reference power, simultaneously performing the test operation on the plurality of first devices under test and the plurality of second devices under test in a second mode where the first enable signal and the second enable signal are simultaneously activated,
wherein, in the (1-1)-th mode in which the plurality of first load switches are set to a switch on state and the plurality of second load switches are set to a switch off state, the test operation for the first test item is performed on the plurality of first devices under test, and
wherein in the (1-2)-th mode in which the plurality of first load switches are set to the switch off state and the plurality of second load switches is set to the switch on state, the test operation for the first test item is performed on the plurality of second devices under test.

11. The method of claim 10, wherein
in the (1-1)-th mode, a first supply power is supplied from the plurality of first load switches to corresponding ones of the plurality of first devices under test, respectively, and is not supplied to the plurality of second devices under test, and
in the (1-2)-th mode, a second supply power is supplied from the plurality of second load switches to corresponding ones of the plurality of second devices under test, respectively, and is not supplied to the plurality of first devices under test.

12. The method of claim 11, further comprising:
performing the test operation for a second test item,
wherein the test operation for the second test item includes performing the test operation for the second test item in the second mode.

13. The method of claim 12, wherein in the second mode, a third supply power is supplied from the plurality of first load switches to corresponding ones of the plurality of first devices under test, respectively, and from the plurality of second load switches to corresponding ones of the plurality of second devices under test, respectively.

14. The method of claim 13, wherein a magnitude of the first supply power is greater than a magnitude of the third supply power.

15. A test method comprising:
calculating a minimum supply power to be supplied to a plurality of first devices under test and a plurality of second devices under test as a reference power;
obtaining power consumption for each device under test when a test operation for a test item is performed;
when the power consumption for each device under test is greater than the reference power, performing the test operation for the test item on the plurality of first devices under test in a (1-1)-th mode where a first enable signal provided to a plurality of first load switches connected with the plurality of first devices under test is activated and a second enable signal provided to a plurality of second load switches connected with the plurality of second devices under test is deactivated and then performing the test operation on the plurality of second devices under test in a (1-2)-th mode where the first enable signal is deactivated and the second enable signal is activated; and
when the power consumption for each device under test is smaller than the reference power, simultaneously performing the test operation for the test item on the plurality of first devices under test and the plurality of second devices under test in a second mode where the first enable signal and the second enable signal are simultaneously activated.

16. The method of claim 15, wherein,
in the (1-1)-th mode, a first supply power is supplied from the first load switches to the first devices under test and is not supplied to the second devices under test, and
in the (1-2)-th mode, a second supply power is supplied from the second load switches to the second devices under test and is not supplied to the first devices under test.

17. The method of claim 16, wherein in the second mode, a third supply power is supplied from the first load switches to the first devices under test and from the second load switches to the second devices under test.

18. The method of claim 17, wherein a magnitude of the first supply power is greater than a magnitude of the third supply power.

19. The method of claim 17, wherein a magnitude of the minimum supply power is identical to the magnitude of the third supply power.

* * * * *